United States Patent
Jones

(10) Patent No.: US 10,303,527 B1
(45) Date of Patent: May 28, 2019

(54) ACTIVE DIRECTORY ATTRIBUTE MAPPING

(71) Applicant: OPEN INVENTION NETWORK LLC, Durham, NC (US)

(72) Inventor: Nathan Robert Jones, Atlanta, GA (US)

(73) Assignee: Open Invention Network LLC, Durham, NC (US)

( * ) Notice: Subject to any disclaimer, the term of this patent is extended or adjusted under 35 U.S.C. 154(b) by 0 days.

(21) Appl. No.: 14/250,535

(22) Filed: Apr. 11, 2014

Related U.S. Application Data

(60) Provisional application No. 61/856,169, filed on Jul. 19, 2013.

(51) Int. Cl.
   *G06F 9/54* (2006.01)

(52) U.S. Cl.
   CPC .................. *G06F 9/542* (2013.01)

(58) Field of Classification Search
   CPC ....................................... G06F 9/542
   See application file for complete search history.

(56) References Cited

U.S. PATENT DOCUMENTS

| | | | | |
|---|---|---|---|---|
| 6,871,346 B1* | 3/2005 | Kumbalimutt et al. | ...... | 718/104 |
| 7,882,132 B2* | 2/2011 | Ghatare | ............ | G06F 17/30569 707/782 |
| 8,145,666 B2* | 3/2012 | Bell | .................. | H04L 29/12132 707/769 |
| 2003/0058277 A1* | 3/2003 | Bowman-Amuah | ........................ | G06F 17/30607 715/765 |
| 2004/0243668 A1* | 12/2004 | Harjanto | ........... | H04L 29/12169 709/203 |
| 2009/0037446 A1* | 2/2009 | Tonev | ............... | G06F 17/30917 |
| 2009/0049200 A1* | 2/2009 | Lin | ................... | G06F 17/30569 709/246 |
| 2014/0108670 A1* | 4/2014 | Naik et al. | .................... | 709/229 |

* cited by examiner

*Primary Examiner* — S. Sough
*Assistant Examiner* — Kimberly L Jordan

(57) ABSTRACT

An application programming interface (API) may provide accessing an active directory and searching for a native active directory object to identify data stored in the active directory. The procedure may also include retrieving schema information associated with the active directory applying the schema information to an application and overriding the application configuration based on the schema information. The procedure may also include translating the native object into a different language dictionary than a current language dictionary.

21 Claims, 8 Drawing Sheets

ACTIVE DIRECTORY ATTRIBUTE MAPPING

CROSS-REFERENCE TO RELATED APPLICATION

This application claims priority to an earlier filed provisional patent application No. 61/856,169, entitled "Active Directory Attribute Mapping" filed on Jul. 23, 2013, the entire contents of which are hereby incorporated by reference.

TECHNICAL FIELD OF THE APPLICATION

This application relates to communicating and mapping data with the active directory via an application programming interface (API) in an optimized configuration.

BACKGROUND OF THE APPLICATION

Conventionally, application programming interfaces (APIs) have provided computer programmers with the capability to integrate existing applications with new and advanced functionality. In general, an application programming interface (API) is an interface for software components to communicate with each other for integration, editing, and other features. An API is a library that may include support for routines, data structures, object classes, and variables.

An API specification may include libraries of a programming language, e.g. standard template library in C++ or in a JAVA API. APIs are also useful for online resources, such as websites and other remotely accessible applications. APIs may also provide specific classes for each object type but do not generally provide the same flexibility.

An active directory (AD) is a directory service created by MICROSOFT for WINDOWS domain networks, and is included in most WINDOWS SERVER operating systems. An AD domain controller authenticates and authorizes all users and computers in a WINDOWS domain type network by assigning and enforcing security policies for all computers and installing or updating software. For example, when a user logs into a computer that is part of a WINDOWS domain, the AD checks the submitted credentials and determines whether the user is an administrator or a normal user. The AD may use a lightweight directory access protocol (LDAP).

The attributes could be translated between an application and an AD but such a translation would likely include every attribute from the source. Ideally, the user would be permitted to select which attributes will be returned in a particular destination format. Not only does this configuration provide flexibility but it also expedites system performance.

SUMMARY OF THE APPLICATION

One embodiment of the present application may include a method of that includes searching for a native active directory object to identify data stored in an active directory, retrieving schema information associated with the active directory, applying the schema information to an application and overriding the application configuration based on the schema information, and translating the native object into a different language dictionary.

Another example embodiment includes an apparatus that includes a memory configured to store a native active directory object and a processor configured to search for a native active directory object to identify data stored in an active directory, retrieve schema information associated with the active directory, apply the schema information to an application and override the application configuration based on the schema information, and translate the native object into a different language dictionary.

DETAILED DESCRIPTION OF THE APPLICATION

Figure 1:
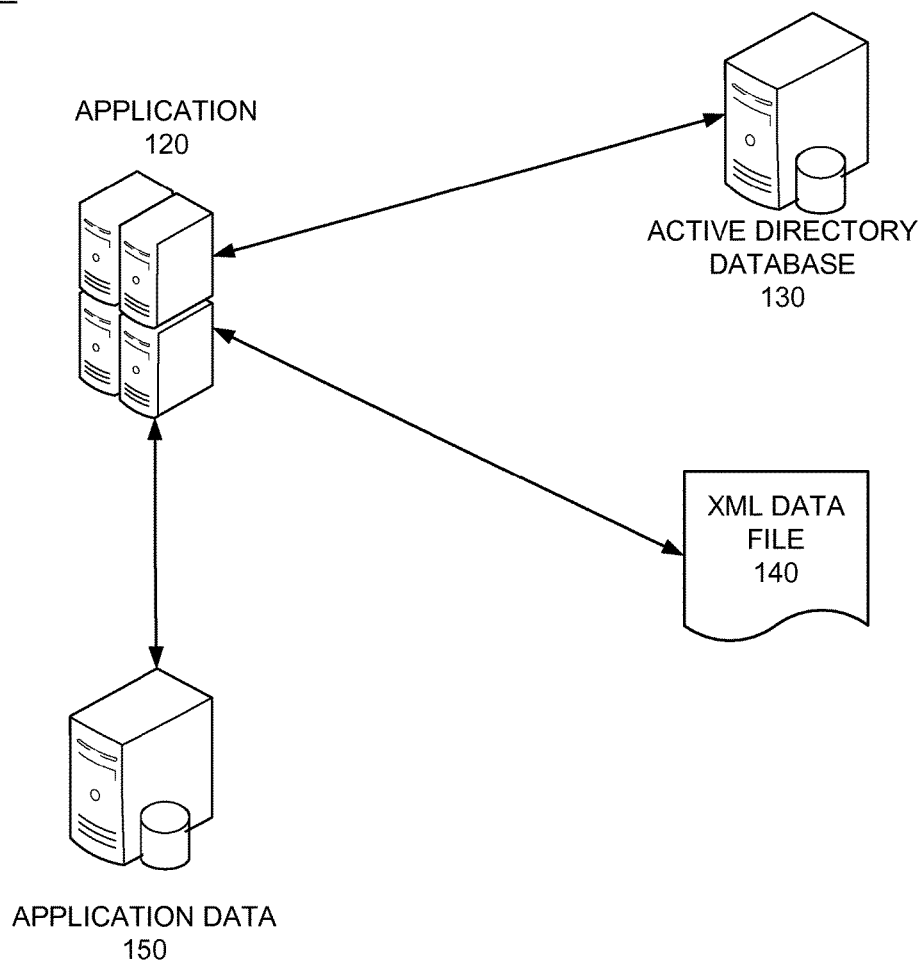
FIG. 1 illustrates an example communication network according to example embodiments of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide a flexible application programming interface (API) that interfaces with any application by utilizing an active directory. For example, an active directory attribute mapping function may be used to resolve any compatibility cross-platform concerns by translating any data based on destination attribute formats utilized with the active directory.

According to one example, a manual override can be entered for a translation exception. Not only will the attributes be formatted, but all data aliases are also applied in the destination format. Such a compatibility model provides a flexible and seamless way to connect applications to an active directory and facilitate the flow of data between the application and the active directory.

According to example embodiments, any application that utilizes active directory data to interface with the active directory may be optimized by the AD mapping procedures described throughout this disclosure. Translating the data attribute formats from the format in the AD to a format used by an application, and vice versa provides increased flexibility. The actual translation logic is included in the application code within the application being interfaced with the AD. The protocol used to connect the application to the AD is the lightweight directory access protocol (LDAP). An XML file provides even more flexibility by allowing manual overrides to be specified for consideration in any translation.

In general, an AD structure is a hierarchical arrangement of information about objects. The objects represent resources (e.g., printers, network devices) and security principals (e.g., users, computer accounts, groups, etc.). Each object represents a single entity, such as a user, a computer, a printer, or a group and its attributes. Certain objects can contain other objects. An object is uniquely identified by its name and has a set of attributes, such as characteristics and information that the object represents. These attributes are defined by a schema, which also determines the kinds of objects that can be stored in the AD. The schema object lets administrators extend or modify the schema as needed.

FIG. 1 illustrates an example network configuration of an AD access and communication system platform according to example embodiments. Referring to FIG. 1, the network 100 includes an application server 120, which stores the application where the application's logic resides. The logic for the translation of the attributes is contained within the application code. The translation will translate attributes retrieved from the AD database 130 to match the format being used by the application. If any updates are made to the attributes at the application layer, those are translated back to the active directory format and stored in memory.

The application database 150 stores application data that may be used to define the desired format for the AD attributes, and the attributes from the AD are translated to match this format. The AD database 130 stores security-related user information, which is organized into objects each of which has several attributes. The attributes are communicated to interfacing applications via the LDAP. The XML file 140 may store any manually entered exceptions to the translation logic to provide for seamless mapping between the AD data and the attributes needed.

Figure 2A:
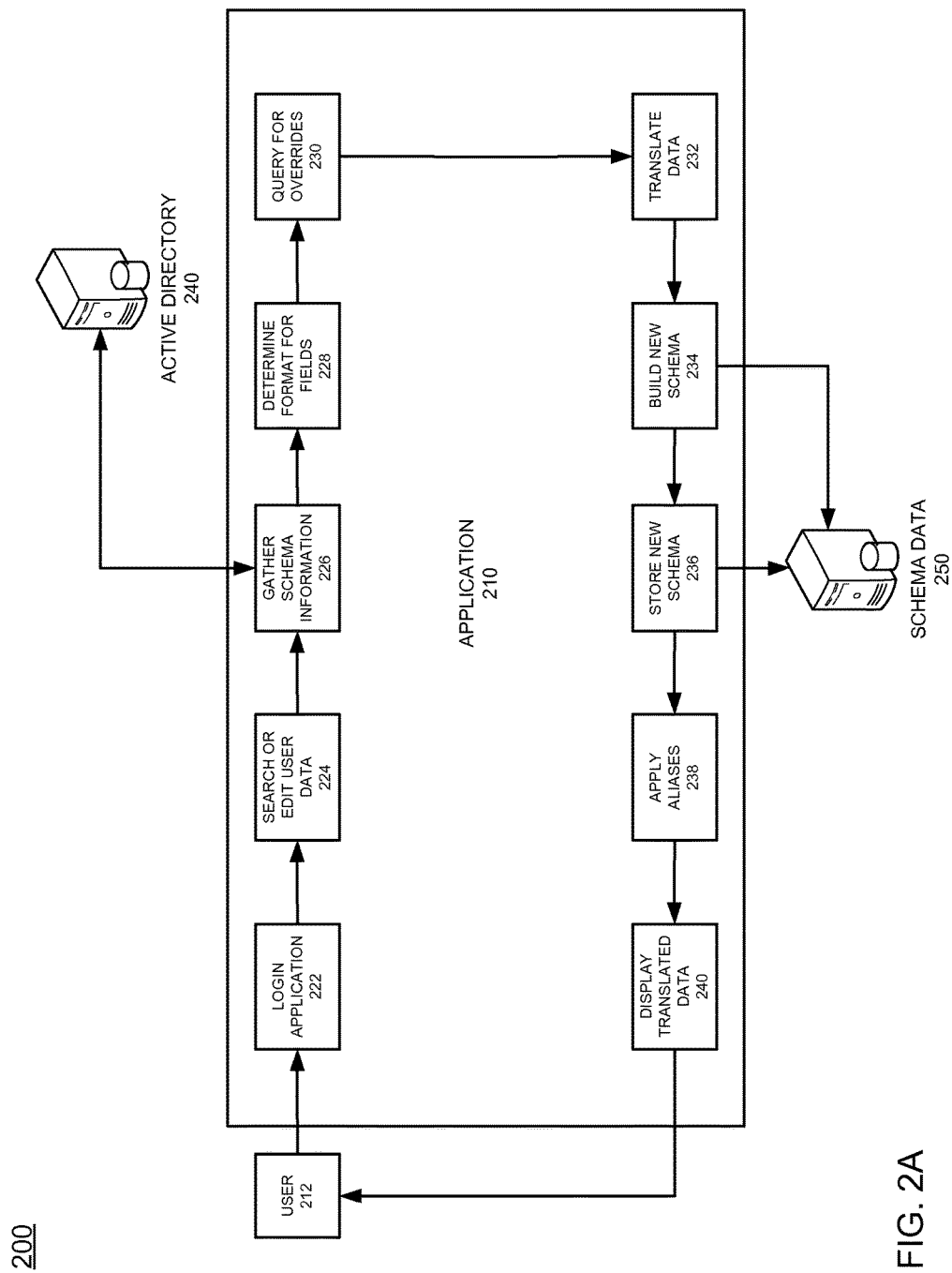
FIG. 2A illustrates an example logic diagram according to example embodiments of the present application.

FIG. 2A illustrates an application access and corresponding application operations according to example embodiments. Referring to FIG. 2A, the user 212 logs into the application 222 via submitting login credentials to the application interface. The user may log into any application that has an interface with the active directory (AD). The user submitted data is used to perform a search or to edit user data 224. In one example, a search operation and/or a user data editing operation may be performed by gathering schema data 226 from the active directory 240.

The user will submit a command in the application to query an attribute from the AD 240 or perform an update to an attribute stored within the AD 240. As a result, the application 210 may gather and retrieve schema information from the AD 240 to store in the modified schema data 250 if an edit is performed. Also, additional schema information may be gathered from the application 210 if querying is performed. Based on the AD attribute information and format of the AD 240, a format for mapping and related compatibility of certain required fields is determined 228 which may be needed in the schema information will set the format for a translation.

If a query is made from the application 210, the AD attributes that will be returned must be translated to the application's predetermine format. However, if an edit is performed to an attribute, then the attributes must be translated from the application format to the format of the AD 240. Whenever a translation is necessary, the setup XML file may be queried for any manual overrides that are pre-existing and which should be considered 230 in the translation process, and if necessary the data may be translated to a desired format 232. The attributes utilized may be translated to a format specified in the schema information and which may be overridden by the XML overrides included in the XML document that is referenced.

The field format needed or required may be incorporated into the new schema that is created or built 234 with the translated data, and the connection information associated with the new schema for the application is stored 236 in the schema data memory 250 for future sessions. The aliases required may then be applied 238 for any specified attribute aliases to the new schema stored in memory 250. Next, the translated data may then be displayed 240. The completely translated data, with aliases, are displayed to the user on the user device. The user device may be a computer, laptop, mobile, wireless or cellular phone, a PDA, a tablet, a client a server or any device that contains a processor and/or memory, whether that processor or memory performs a function related to an embodiment of the application.

According to example embodiments, a security web-based access tool may administer privileges based on a user's role. In this example of an application that requires input from an AD to perform its functions. The tool may be used for consistent and organized enabling of administrative tasks associated with users. In a typical process for an API to access the AD, the AD attribute mapping process for the API to map the AD be performed based on the following code example:

```
Domain d = Domains.Find("somedomainname"); //
an abstraction used to get a connection to the domain for
searches
List<DirectoryEntity> results = d.Search("CN=MyContainer",
"(givenName=Bob)", SearchScope.SubTree, "FirstName",
"LastName", "DisplayName");
    foreach (var entity in result)
    {
       Console.WriteLine("Hello there, " +
entity["FirstName"]);
       entity["FirstName"] = "Phil";
       Console.WriteLine("I'm going to call
you " + entity["FirstName"] + " from now on.");
    }.
```

An example output (assuming one result), may provide: "Hello there, Bob I'm going to call you Phil from now on". In the above example, it is possible to connect to a domain and issue a search query to obtain query results. The schema information may be passed as the last three parameters in this example. This function can utilize any number of attribute names (or none), and those names can be either the configured alias or the actual designated active directory name. The result is a list of "DirectoryEntity" objects, which is an abstraction of an active directory object, which are populated with data matching the passed attributes and conforming to the generated schema (typed correctly, etc.). In the example above, the "FirstName" attribute is actually the "givenName" attribute in the active directory, and in the resulting abstraction is represented by a C# string type.

In this case, the developer using the API would not need to know the underlying details of how "FirstName" is stored in the AD. The user would simply seek an entity containing that attribute and can then work with it as if it were simply a property of that entity. When the user calls entity.SaveChanges( ), the schema logic operates in reverse to take the C# values and store them appropriately in the AD. No conversions or type checking is needed by the developer operating the mapping operation. Further, if a different AD attribute is used to store first names, then the API can be configured to map the "FirstName" alias to the other attribute.

According to another example, each object in the AD has one or more object classes that define the attributes that it contains. For example, a typical user account will include the "user" and "person" classes as well as some other base classes. A computer account may also have the "user" object class in addition to the "computer" class. As a result, whatever attributes are defined as part of the "user" class are common to both the user and the computer objects. However, the data that these common attributes represent and how they may be used can differ greatly in actual usage. Accordingly, the application may query the schema container of an AD forest which includes each domain having different collections of schemas applied for all attributes and for particular object classes, and which attributes they contain. An object class definition has a set of its own attributes, and can also inherit attributes from other objects if a subclass structure is defined.

Each attribute definition contains information about the data it represents, such as name, type, range validation, read/write access, multi-values vs. single-values, etc. This application takes in this information and combines it with application specific configuration to create a mapped attribute representation that can be consumed or operated easily by an application. This configuration may alias an attribute, such as ex: "LastName" instead of "sn", or indicate that an attribute should be treated as single value even when it is defined as multi value, such as a "description" which is multi-valued, but in most use cases the first entry is the only one used.

The type of the attribute or syntax is mapped to a corresponding type in a higher order language. In C#, for example, a syntax of "2.5.5.6" is a string value in the AD, but represents a number, so it is remapped a C# integer. Date values particularly benefit from this configuration as there are several ways in the AD to represent a date, but in this case the C# DateTime structure is used in the application code. Beyond this mapping logic, there is some additional processing that needs to occur as types may not have a one-to-one matching between syntax and language type. One example would be GUIDs. In the AD, the objectGuid attribute is stored as an octet string, which is generally mapped to a C# string. But in the particular case of the objectGuid attribute, the objectGuid may be mapped to the System.Guid type, which we can achieve through a mapping override defined in the configuration. Other nuances, such as the tokenGroups attribute containing a mix of byte arrays and strings must also be handled by custom logic rather than a mapping rule.

Once all the mappings are completed, a custom schema object is constructed which contains the collection of attribute mappings pertaining to the particular object class desired. This custom schema is used in the abstract object representing the concrete AD object to move values back and forth between the AD and the application logic.

Other than the code sample above, a configuration file may be used to map attribute data. Further, if an entity object is used and additional attributes are needed, the schema for that entity can be augmented by asking for more attributes via: entity.ExtendSchema(new string[ ]{"EmployeeID", "Level", "Manager"}). The actual meta data for each attribute should be handled through the configuration, as those definitions are shared among all entities in the application and changing the nature of them during execution could lead to consistency problems in the application (if not handled carefully). The example of the configuration file is provided below:

```
<AttributeMappingSettings>
<AttributeOverrides>
<Attribute name="businessCategory" adType="Dictionary" clrType="System.Collections.Generic.Dictionary'2[System.String,System.String]" />
<Attribute name="description" adType="String" clrType="System.String" />
<Attribute name="departmentNumber" adType="String" clrType="System.String" />
<Attribute name="extensionAttribute13" adType="UnixTime" clrType="System.DateTime" />
<Attribute name="extensionName" adType="Dictionary" clrType="System.Collections.Generic.Dictionary'2[System.String,System.String]" />
<Attribute name="flags" adType="Number" clrType="SouthernCompany.InformationTechnology.SecurityWebWare.MainframeFlags" />
<Attribute name="ipServiceProtocol" adType="String" clrType="System.String" />
<Attribute name="msDS-User-Account-Control-Computed" adType="Number" clrType="SouthernCompany.InformationTechnology.SecurityWebWare.UserAccountControl" readOnly="true" />
<Attribute name="msFVE-RecoveryGuid" adType="GUID" clrType="System.Guid" readOnly="true" />
<Attribute name="msFVE-VolumeGuid" adType="GUID" clrType="System.Guid" readOnly="true" />
<Attribute name="objectClass adType="ObjectClass" clrType="System.String" readOnly="true" />
<Attribute name="objectGUID" adType="GUID" clrType="System.Guid" readOnly="true" />
<Attribute name="otherIpPhone" adType="String" clrType="System.String" />
<Attribute name="otherMobile" adType="String" clrType="System.String" />
<Attribute name="otherPager" adType="String" clrType="System.String" />
<Attribute name="otherTelephone" adType="String" clrType="System.String" />
<Attribute name="schemaFlagsEx" adType="Number" clrType="System.Int32" />
<Attribute name="SCS-cicsID" adType="Boolean" clrType="System.Boolean" />
<Attribute name="SCS-mainframeID" adType="Boolean" clrType="System.Boolean" />
<Attribute name="SCS-omvsID" adType="Boolean" clrType="System.Boolean" />
```

```
    <Attribute name="SCS-tsoID" adType="Boolean"
clrType="System.Boolean" />
    <Attribute name="seeAlso" adType="DistinguishedName"
clrType="System.String" />
    <Attribute name="userAccountControl" adType="Number"
clrType="SouthernCompany.InformationTechnology.SecurityWebW
are.UserAccountControl" />
    <Attribute name="msExchVersion" adType="String"
clrType="System.String" readonly="true" />
    </AttributeOverrides>
    <Mappings>
      <Entry_key="computer">
    <AttributeMapping attribute="accountexpires"
alias="AccountExpirationDate" displayName="Account
Expiration Date" historyDisplayName="ACCOUNTEXPIRES" />
    <AttributeMapping attribute="businessCategory"
alias="AccountProperties" />
    <AttributeMapping attribute="otherIpPhone"
alias="CallManagerPrefixes" displayName="Call Manager
Prefixes" historyDisplayName="CALLMANAGERPREFIXES" />
    <AttributeMapping attribute="ipPhone"
alias="CallManagerRole" displayName="Call Manager Role"
historyDisplayName="CALLMANAGERROLE" />
    <AttributeMapping attribute="distinguishedName"
alias="ComputerRole" expression="REGEX(/OU=( [ /\, ] + ) /, )" />
  </Entry>
  </Mappings>
</AttributeMappingSettings>.
```

Figure 2B:
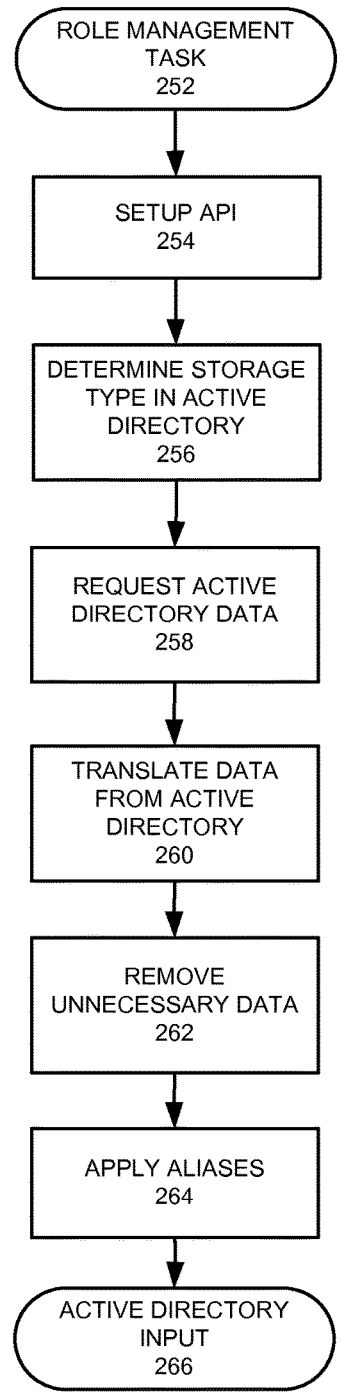
FIG. 2B illustrates an example flow diagram according to the prior art.

FIG. 2B illustrates an example flow diagram of a process for API mapping to the active directory via a conventional prior art approach. Referring to FIG. 2B, the flow diagram 250 includes an initial role management task 252 that operates by setting up the API 254 and determining a storage type in the AD 256 for access purposes. Next, a request for an active directory data content is transmitted to the AD 258 and the data is translated from the AD 260. Any unnecessary data is removed 262 and the aliases are applied 264 prior to the AD input being provided for the roles 266. In operation, this approach in FIG. 2B is a typical action performed against an active directory (AD). The host application code must have specifically defined knowledge about the types of objects that it will be operating with and their corresponding attributes including the function of the attributes. However, the example in FIG. 2C is an automated approach that overcomes the shortcomings of the requirements of the example API to AD mapping in FIG. 2B.

Figure 2C:
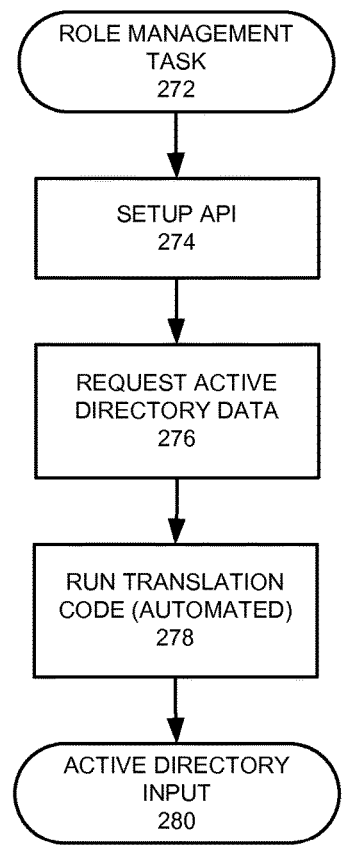
FIG. 2C illustrates an example flow diagram according to example embodiments of the present application.

FIG. 2C illustrates an example attribute mapping method for an API to an AD communication process. Referring to FIG. 2C, the flow diagram 270 includes a role management task 272 that initiates in response to an AD access operation. The process proceeds by initiating communication with the AD and setting up the API 274 to interface with the AD. A request for an AD access may be performed to retrieve certain directory data 276. The translation code may be initiated via an automated operation and the AD input for the various roles may then be received.

The role management task 272 is an operation against an object in the AD. For example, creating objects, editing attributes on an object and/or adding/removing members from groups. The task would be triggered from a host application code. The setup task 274 provides a connection being established to the active directory that is initiated by the host application code. For instance, in order to search for users in the active directory a connection is initiated and configured. The request for the active directory data 276 is triggered from the host application code including commands to search for specific objects using an open connection or to obtain properties of a single specified object.

The translation code operation 278 provides for operating with objects from the active directory (AD), the translation code accesses the native AD object(s) and translates its attributes into a different object, such as a named entity 'DirectoryEntity' in a higher level language (i.e., C#) on the fly. This 'DirectoryEntity' object can be manipulated like any other object in the host application code, and then when changes are to be saved back to AD, the translation code works in reverse to properly set the attributes in the native AD object(s). The interactions with the active directory (AD) during this operation are performed when the object is retrieved from and then written back to AD. The 'DirectoryEntity' object may include both the translated attributes obtained from the AD and a schema representation to facilitate the translation, but otherwise operates disconnected from the AD. Connections to the AD are only accessed during read and write operations.

According to example, embodiments, a search operation (or a single lookup) would be a typical process type for obtaining the "native" active directory object (ADO). This "native" object may be a particular API representation of the data that is presently stored in the AD, with the distinction being that the API representation stores the data in the same format or data type as the AD including any strings, numbers and/or byte arrays. After the translation procedure, the object would appear as a higher order language dictionary, where the keys are the string name of the field accessible via an alias and/or the actual AD attribute name, and the values are boxed data types specific to the language. For example, if the values were represented in C# the values may include, for example string, DateTime, int, SecurityIdentifier, Guid, etc. For DateTime values, in particular, additional translation may be performed to account for time zone affinity and the several different formats for storing date information in the AD. In addition to this dictionary structure, the translated object contains all of the schema information used in the transformation so that the higher level representation can be translated back in to the "native" AD data when necessary.

The "native" API data structure could be manipulated and modified but not as easily as the AD since the API would require similar translations of the data. This mapping abstraction process provides a simpler and more optimized way to work with the data. The same schema information that is used to translate from native AD formats can be used in reverse. For example, a date value may be stored in a file time representation in the AD. This file time is translated into a C# 'DateTime' object through standard .NET API procedures, and there are also methods to do the reverse. The key parts for this configuration are the schema information and the supporting logic to perform the translations.

In general, the AD is largely used as a storage and retrieval mechanism. There are some rules included in the AD to maintain data integrity, but no business logic would or should be executed in the AD itself. Any application operating on AD data would have to perform its processing in its own code base, but in all cases the actual retrievals and commits would occur in the AD. The intent of the statement is to demonstrate that this abstraction layer obscures the inner workings of the AD from the application logic and does not actually work with data in a "native" way but for retrievals and commits.

The schema is a combination of configurations stored in the AD and in the application. AD attributes have schema information of their own that is stored at the forest level. This AD schema information is retrieved by the mapping logic, and then combined with a local application configuration to apply overrides. Examples of overrides would include aliasing fields, overriding default type mappings, for example, to convert the 'objectSid' attribute to a string rather than a byte array, overriding attribute multiplicity, for example, the description attribute is multi-valued, but it is not desired to be treated as a single string, or specifying strongly typed enumerations to map flag fields to as opposed to working with them as 64-bit integers). The schema is retrieved and combined before any translations are done, and should be stored in a cache to increase the speed of subsequent translations.

Figure 3:
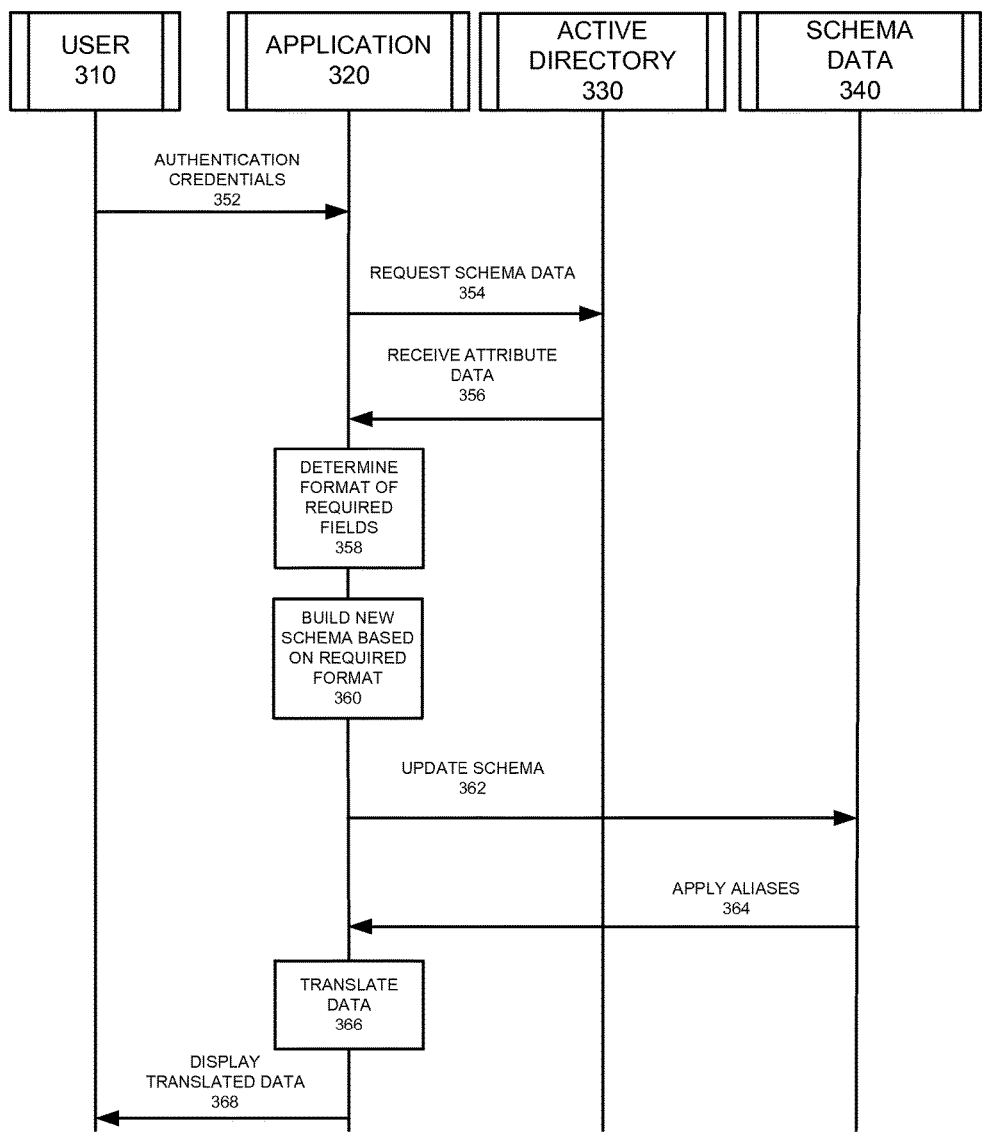
FIG. 3 illustrates an example system communication diagram according to example embodiments of the present application.

FIG. 3 illustrates an example system communication flow of the signaling among data elements operating on the network according to example embodiments. Referring to FIG. 3, the flow diagram 300 includes an initial process of authenticating user credentials 352 when a user machine 310 seeks access to a particular application 320 via an API or other interface. The access operation may trigger a request for schema data 354 being sent to the active directory 330, which returns the attribute data 356 of the schema 340. As a result, the application API may identify the format of the required fields 358 and build a new schema based on that specific required format 360. The schema 340 can be updated accordingly 362 to include any modifications derived from the format associations. The aliases used may be identified and applied 364 from the AD to the API. The translation data 366 can then be derived from the API based on the AD modifications and provided 368 to the user device 310.

According to example embodiments, the native AD object is obtained each time a search returns results, a specific account may be requested and/or a group's membership is enumerated. The AD may be considered a backing store with logic to enforce constraints and workflows. The API is code to support a user interface and serves as the middle tier between a user interface and the AD. As a result, the AD does not populate the API but the API may populate the AD. The API contains configuration data used to instruct it how to interpret data in the AD and translate the data into more usable data structures. This procedure may occur every time an object from the AD is manipulated through the API, however, schema mapping may generally only occur one time and may then be cached until a new schema is required.

As for translation, the API translates data structures (i.e., text, numbers, etc.) into other types of data structures that are more adapt for the language in which the application code is implemented. For example, a date value could be stored as text "12/25/2013 3:05:45 PM" or as a number often representing the number of seconds since 1/1/1970 in the AD, and the API would translate this data into a common date structure, such as 'DateTime' in .NET for better use in application code. The keys may represent the names of attributes. For example, "givenName" is the key in the AD for someone's first name. The 'values' are certain values stored in an object pertaining to a particular key. For example, the value for an attribute with the key "givenName" might be "Fred". The AD operates and is structured much like a database. The "D" in AD is "Directory", which can be thought of as a specialized database optimized for reads, rather than writes, whereas a traditional database may be tuned to different performance considerations, such as equal amounts of reads and writes.

In the AD, there is an area of objects that describe schema components. In this area, each attribute would be represented by an object whose attributes defined how that attribute is used, what it represents, which names it can be referenced with, and permissions. This is similar to more traditional databases, where the schema of a table would probably be defined in another table somewhere in a special section of the database. So the AD data is retrieved and formatted into the API in the API native format and then the AD is ignored until the data is saved. Once the AD data is translated through the API, the application code would need to only work with the API provided objects. No further interactions with the AD would need to occur until either more data is requested, or changes are committed back to the AD. Previously, an application would have to use the native AD objects directly, in a largely connected state, and with the data structured in the AD native formats.

The 'accountExpires' attribute in the AD may have a value of '130396608000000000' in the AD which represents a date of "3/18/2014 8:00:00 PM EDT". The API would translate this value into a .NET DateTime object, and the application code can use or manipulate the date in the richer DateTime structure. The API can have aliases configured so that the application does not have to know the actual name of the attribute in the AD. Assuming the alias is "AccountExpirationDate". The API processes the translation of the value from a number to a DateTime and back again as needed. The aliasing feature is particularly useful if general AD attributes are used, such as like 'extensionAttribute1' to store certain pieces of data, and later decide to use a different AD attribute instead. By changing the configuration to have the API's alias to the AD attribute pointed at the different AD attribute, the application's code would not have to be changed. This helps achieve a desirable level of decoupling of the application code from the underlying data source (AD). The mapping, on its own, would not change the actual data—just the representation of that data. In the accountExpires example above, '130396608000000000' and "3/18/2014 8:00:00 PM EDT" both represent the same data, but would be worked with in different ways. Changing the DateTime representation to a different data format or structure would result in a different number stored in the AD only if the application acts through the API to commit that change back to the AD. Dates are a particularly good example here because there are a handful of different formats that dates can be stored in the AD.

Another example would be security identifiers. Security identifiers are a primary key attribute of a directory object. The name of an attribute could change, such as a login name or email, for example, but the security identifier (SID) may not change. SIDs can be represented in the AD as either text or an array of bytes. The API can represent the values to the application code as text and translate them into either format as the case depends. When and how the translation occurs is represented by the schema as instructions for how to translate all of the bits of data.

Figure 4:
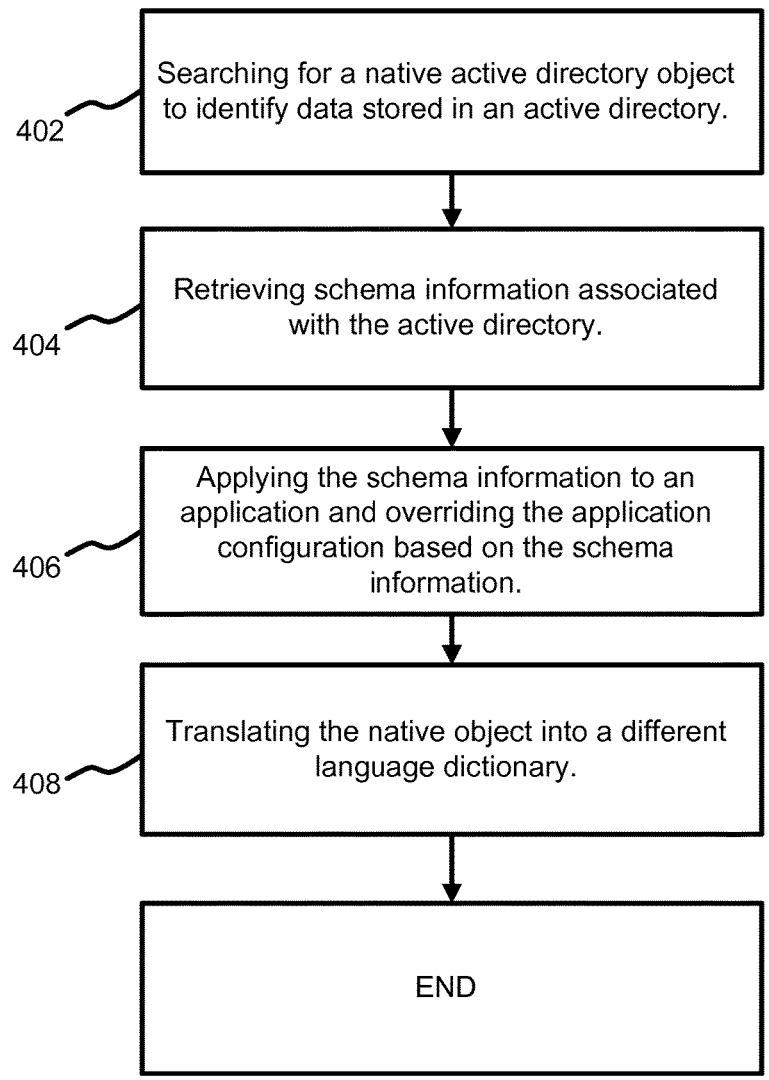
FIG. 4 illustrates another flow diagram of an example method according to an example embodiment of the present application.

FIG. 4 illustrates an example method of operation in a flow diagram 400. Referring to FIG. 4, the method may provide searching for a native active directory object to identify data stored in an active directory when accessing the active directory via an application programming interface (API) at operation 402. The method may also include retrieving schema information associated with the active directory at operation 404 and applying the schema information to an application and overriding the application configuration based on the schema information at operation 406. The method may also include translating the native object into a different language dictionary at operation 408.

Figure 5:
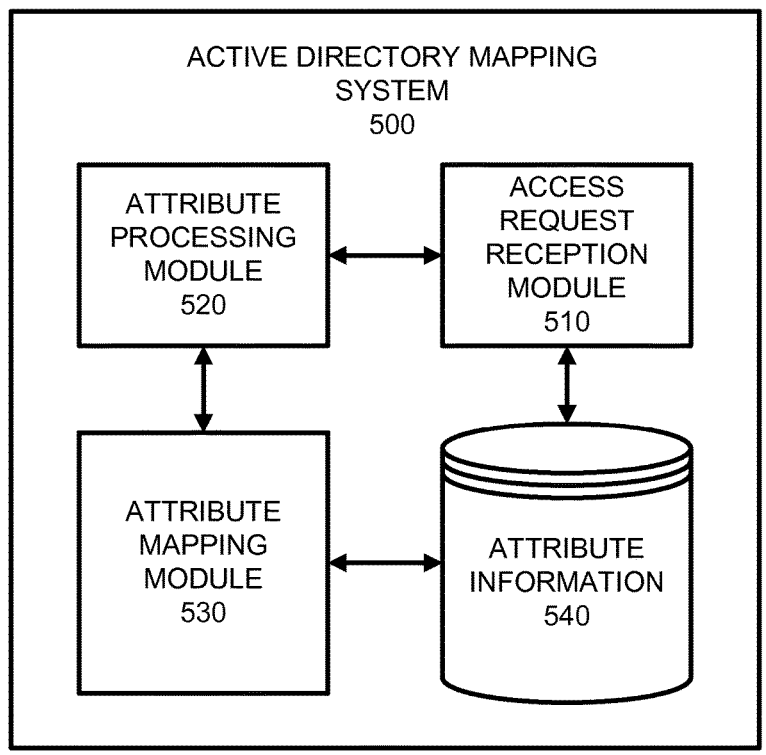
FIG. 5 illustrates a system configuration that is configured to perform one or more operations corresponding to the example embodiments.

FIG. 5 illustrates an example system configuration 500 configured to perform one or more of the example embodiments. Referring to FIG. 5, the active directory mapping system 500 may include an access request reception module 510 which identifies the request for the active directory and initiates a search for a native active directory object to identify data stored in an active directory. The attribute processing module 520 may retrieve schema information from the attribute information databank 540 associated with the active directory and the attribute mapping module 530 may apply the schema information to an application and override the application configuration based on the schema information, and translate the native object into a different language dictionary than the current language being utilized.

The native directory object is an application programming interface (API) representation of the data stored in the active directory and the API stores the active directory data in a same format as the data stored in the active directory. The translating of the native object into the different language dictionary may also include changing key values to string names of fields and values may be translated to boxed data types specific to different language directory. The native object is further translated to include all schema information used during the translation. The schema information include at least configuration stored in the active directory and in the application being accessed. The overriding the application configuration may also include applying at least one of aliasing fields and converting default attribute types to different attribute types.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components 102 and 103, etc.

Figure 6:
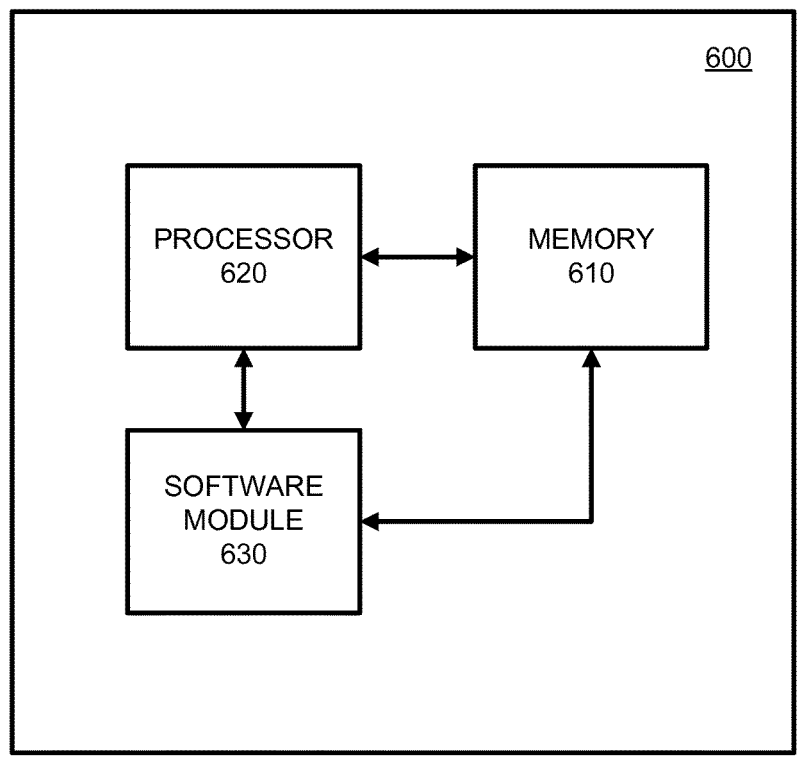
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving a native active directory object stored in an active directory;
retrieving schema information associated with the active directory, the schema information identifying formats of attributes included in the native active directory object;
generating a translated object comprising one or more attributes of the native active directory object translated into a format of the application based on a schema that is being implemented by the application, wherein the generating further comprising adding instructions within the translated object for transforming the one or more translated attributes back to a format of the active directory;
performing an operation based on at least one translated attribute of the native active directory object causing a value of the at least one translated attribute of the native active directory object to be modified; and
converting the format of the at least one modified attribute from the application format back into the format of the active directory based on the instructions included within the translated object and storing the at least one converted modified attribute in the active directory to reflect the modification to the value thereof.

2. The method of claim 1, wherein the native active directory object comprises an application programming interface (API) representation of the data stored in the active directory.

3. The method of claim 2, wherein the API stores the native active directory object data in a same format as the data stored in the active directory.

4. The method of claim 1, wherein the translating comprises changing key values to string names of fields and changing other values to boxed data types specific to a different language directory.

5. The method of claim 4, wherein the translating comprises adding all schema information used during the translation to the native active directory object to facilitate the at least one modified attribute of the native active directory object being translated back to the active directory format.

6. The method of claim 1, wherein the translating comprises applying an alias defined by the application to an attribute from among the one or more attributes of the native active directory object.

7. The method of claim 1, wherein the native active directory object includes a first attribute defined by a first class and a second attribute defined by a second class that has a different schema than the first class, and the translating comprises translating the first and second attributes of the common native active directory object having different respective schemas into a respective format of the application.

8. The method of claim 1, wherein the native active directory object comprises a plurality of attributes, each attribute from among the plurality of attributes comprises definition information about the data it represents including one or more of a type of the data, a range validation of the data, read or write access, and multi-value or single value, and the definition information is added to the translated object.

9. The method of claim 1, wherein the generating further comprises storing, in a memory, the translated object including the one or more translated attributes together with the instructions for transforming the one or more translated attributes.

10. An apparatus comprising:
a memory; and
a processor configured to
receive a native active directory object stored in an active directory based on a request from an application,
retrieve schema information associated with the active directory, the schema information identifying formats of attributes included in the native active directory object,
generate a translated object comprising one or more attributes of the native active directory object translated into a format of the application based on a schema that is being implemented by the application, and add instructions within the translated object for transforming the one or more translated attributes back to a format of the active directory,
perform an operation requested by the application based on at least one translated attribute of the native active directory object causing a value of the at least one translated attribute of the native active directory object to be modified, and
convert the format of the at least one modified attribute from the application format back into the format of the active directory based on the instructions included within the translated object and storing the at least one converted modified attribute in the active directory to reflect the modification to the value thereof.

11. The apparatus of claim 10, wherein the native active directory object comprises an application programming interface (API) representation of the data stored in the active directory.

12. The apparatus of claim 11, wherein the API stores the native active directory object data in a same format as the data stored in the active directory.

13. The apparatus of claim 10, wherein the processor is configured to translate key values to string names of fields and translate other values to boxed data types specific to a different language directory.

14. The apparatus of claim 13, wherein the processor is configured to add all schema information used during the translation to the native active directory object to facilitate the at least one modified attribute of the native active directory being translated back to the active directory format.

15. The apparatus of claim 10, wherein the processor is configured to apply an alias defined by the application to an attribute from among the one or more attributes of the native active directory object.

16. A non-transitory computer readable storage medium having stored therein program instructions which when executed cause a processing device to implement a method comprising:
   receiving a native active directory object stored in an active directory;
   retrieving schema information associated with the active directory, the schema information identifying formats of attributes included in the native active directory object;
   generating a translated object comprising one or more attributes of the native active directory object translated into a format of the application based on a schema that is being implemented by the application, wherein the generating further comprising adding instructions within the translated object for transforming the one or more translated attributes back to a format of the active directory;
   performing an operation based on at least one translated attribute of the native active directory object causing a value of the at least one translated attribute of the native active directory object to be modified; and
   converting the format of the at least one modified attribute from the application format back into the format of the active directory based on the instructions included within the translated object and storing the at least one converted modified attribute in the active directory to reflect the modification to the value thereof.

17. The non-transitory computer readable storage medium of claim 16, wherein the native active directory object comprises an application programming interface (API) representation of the data stored in the active directory.

18. The non-transitory computer readable storage medium of claim 17, wherein the API stores the native active directory object data in a same format as the data stored in the active directory.

19. The non-transitory computer readable storage medium of claim 16, wherein the translating comprises changing key values to string names of fields and changing other values to boxed data types specific to a different language directory.

20. The non-transitory computer readable storage medium of claim 19, wherein the translating comprises adding all schema information used during the translation to the native active directory object to facilitate the at least one modified attribute of the native active directory being translated back to the active directory format.

21. The non-transitory computer readable storage medium of claim 20, wherein the translating comprises applying an alias defined by the application to an attribute from among the one or more attributes of the native active directory object.

* * * * *